Jan. 30, 1951  D. HALL  2,539,951
CANOPY ATTACHMENT FOR CHILDREN'S VEHICLES
Filed Jan. 30, 1948  2 Sheets-Sheet 1
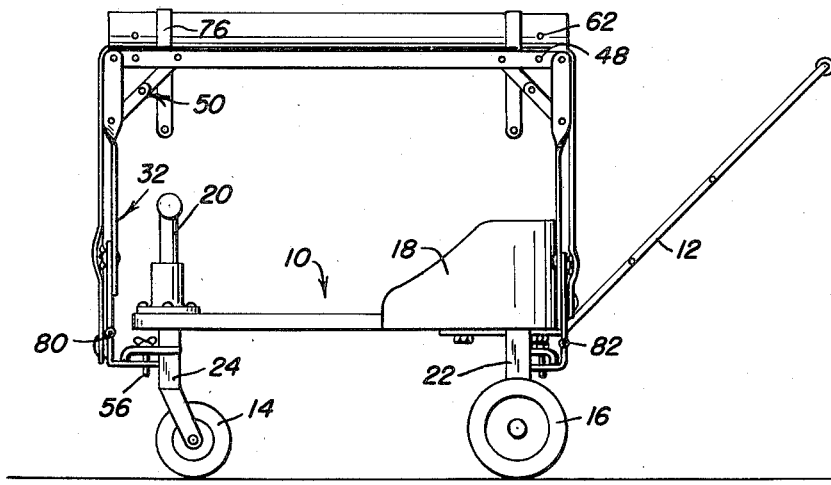
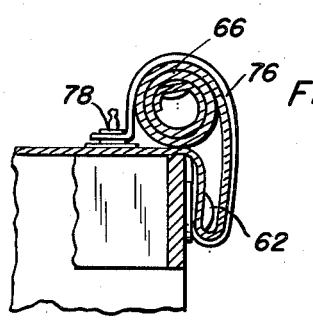
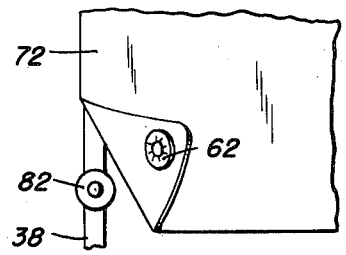
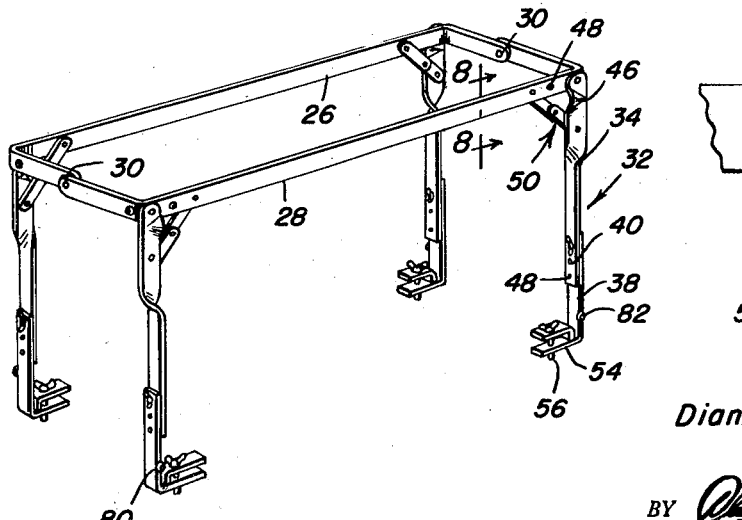
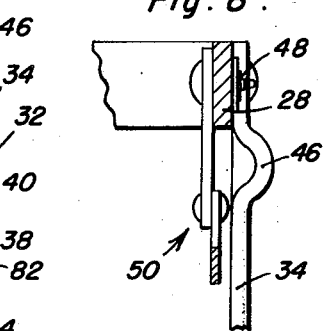
Dianne Hall
INVENTOR.

Jan. 30, 1951     D. HALL     2,539,951
CANOPY ATTACHMENT FOR CHILDREN'S VEHICLES
Filed Jan. 30, 1948     2 Sheets-Sheet 2
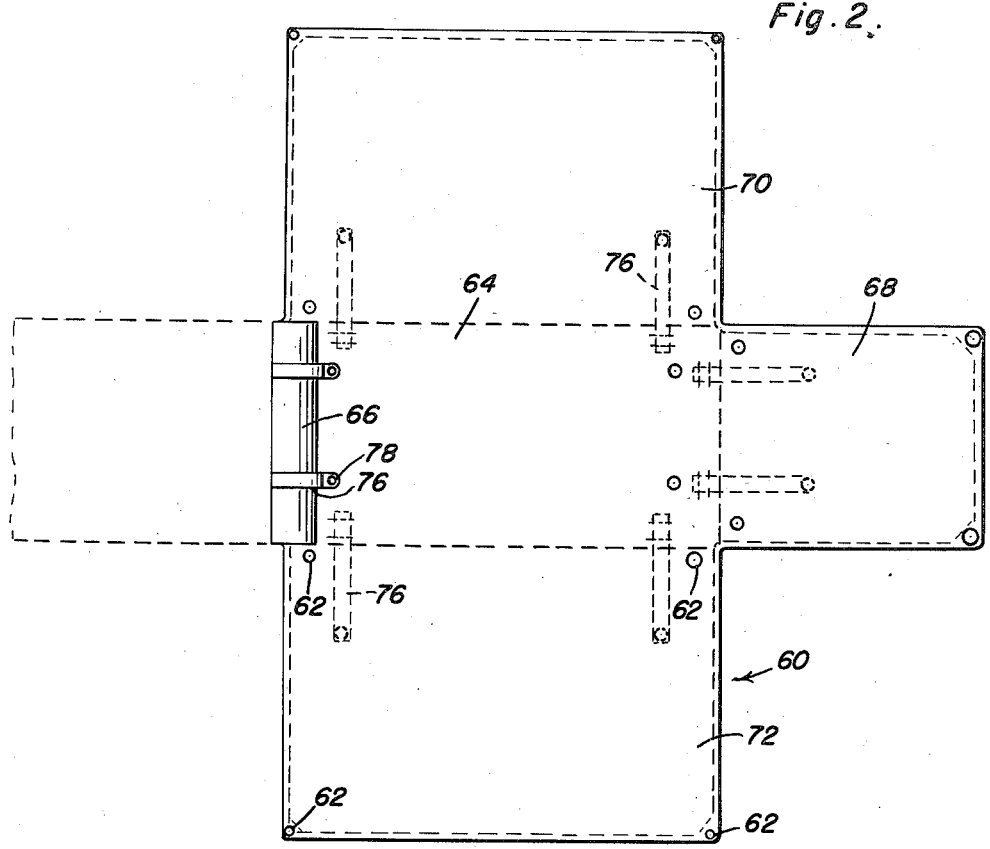
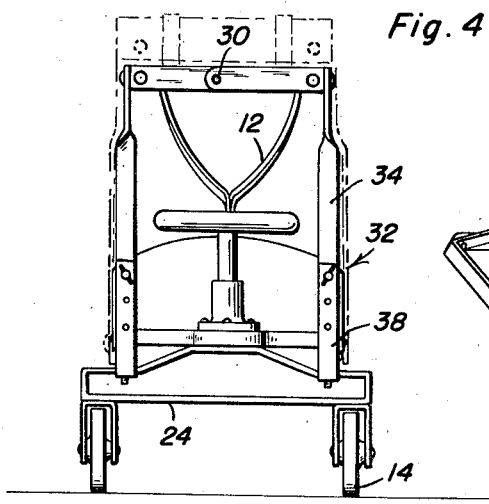
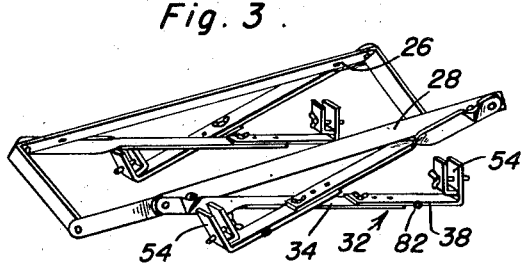
Dianne Hall
INVENTOR.

Patented Jan. 30, 1951

2,539,951

UNITED STATES PATENT OFFICE 2,539,951

CANOPY ATTACHMENT FOR CHILDREN'S VEHICLES

Dianne Hall, Los Angeles, Calif.

Application January 30, 1948, Serial No. 5,215

1 Claim. (Cl. 296—102)

This invention appertains to novel and useful improvements in attachments for vehicles, particularly those utilized by and for children of young age.

An object of this invention is to cover a vehicle such as a child's stroller in order to protect the child against certain elements such as excessive sun, wind, rain and the like.

Another object of this invention is to maintain a cover or closure over a collapsible frame, the closure being attachable to various portions of the frame, whereby certain sections thereof may be maintained open for ventilation and the like.

Another object of this invention is to detachably secure the frame to a stroller or other child's vehicle, whereby the attachment may be readily removed, when so desired. Another object of this invention is to supply the collapsible frame of such construction as to be readily foldable into a compact unit for storage purposes and the like.

Another purpose of this invention is to provide an extremely simple device of the character described which serves its intended function efficaciously.

Other objects and features of novelty will become apparent to those skilled in the art, in following the description of the preferred form of the invention, illustrated in the accompanying drawings, wherein:

Figure 1 is an elevational side view of the preferred form of the invention;

Figure 2 is a plan view of the cover or closure utilized in association therewith;

Figure 3 is a perspective view of the frame in the closed or collapsed position;

Figure 4 is a front view of the invention illustrated in Figure 1;

Figure 5 is a perspective view of the frame in the open position;

Figure 6 is a sectional view of the closure or cover showing the same in the rolled position;

Figure 7 is a perspective view of a portion of the closure showing the snap fastening means used in association therewith; and Figure 8 is a sectional view taken substantially on the line 8—8 of Figure 5 and in the direction of the arrows.

This invention has been developed in order to provide a device for covering a conventional child's vehicle such as a stroller or the like in order to protect the child against certain elements. The invention has been so designed that the frame for supporting the closure, utilized in association with a child's stroller, may be readily collapsed for storage and other purposes.

Further, the frame is of adjustable nature, whereby various heights from the seat of the stroller to the upper portion of the frame may be regulated to compensate for the relative size of the child using the stroller.

Further, it is often desirable to open certain sections of the closure whereby vision is not impeded (the child's vision) and also whereby ventilation may be realized within the closure. When the sun is positioned on one side of the vehicle, the pertinent section of the closure may be lowered, thereby preventing the sun from striking the child directly and perhaps injuring the child's eyes.

The specific structure for performing the aforementioned functions is as follows: A conventional stroller is generally indicated at 10 and has the usual appurtenant features such as a handle 12 along with a caster 14 at one end of the stroller with a pair of conventional wheels 16 at the opposite end. The seat portion 18 is supplied in the usual position while the child's handle 20 is adjacent thereto.

The usual conventional frame or undercarriage is illustrated at 22, while the duplicate construction for supporting the front wheels is indicated at 24. Of course, these front wheels may be casters, if so desired.

Referring now primarily to Figure 5, it is readily apparent that a symmetrical frame is illustrated and consists of a pair of substantially U-shaped members 26 and 28, respectively, which are pivoted together at the extremities of the legs thereof. Conventional rivets 30 or the like may be utilized in association with this pivotal connection.

A plurality of legs generally indicated at 32 are pivotally mounted at the corners of the U-shaped members 26 and 28, respectively. These legs are extensible in nature consisting of a first segment 34 and a second segment 38 having a plurality of apertures 40 therein. Of course, a suitable wing nut and bolt construction may extend through pertinent apertures in order to maintain the segments or sections 34 and 38 in the selected adjusted position.

The upper section 34 is provided with a flared portion 46 to provide clearance for a snap fastener element 48 which is attached directly to the U-shaped member 28. The leg construction (4) are identical in nature and therefore it is believed that the description of only one will necessarily lead to a clear understanding of the remaining.

A self-locking hinge brace, generally indicated at 50, is pivotally associated with the substantially U-shaped member 28 and the upper section 34 of the leg 32. This self-locking hinge member is conventional in nature, being utilized in many environments, such as in connection with collapsible tables and the like.

Means for attaching the lower sections 38 of the legs 32 to the undercarriage of the vehicle 10 is provided. The preferable means consists of a plurality of bifurcated brackets 54 extending at substantially right angles to the longitudinal axis of the said lower section 38. The bifurcations of the said bifurcated brackets 54 are adapted to be positioned around a portion of the undercarriage 24 (and 22, of course) while a set screw, screw 56, or the like may extend through both bifurcations. If the set screw construction is utilized, it may bear directly against the pertinent undercarriage member, or when the through type screw 56 is utilized, it is used similar to a friction clamp construction. For this construction, reference is made primarily to Figure 1. In this instance, the screw 56 extends through both bifurcations and by means of threads urges the bifurcations toward each other, clasping the undercarriage frame element therebetween.

A substantially cross-shaped closure 60 is utilized in association with the frame. It may be attached directly to the frame elements by means of suitable rivets, or by means of snap fasteners 62, thereby rendering the closure or cover detachable relative to the frame. The material of construction of the said cover may be one of many, such as various grades of nylon, canvas, water repellant materials and the like. The central section 64 of the said cover 60 is positioned over the said substantially U-shaped members 26 and 28, while the extending sections 66, 68, 70 and 72, respectively, may be rolled between the various pertinent legs 32 to selective heights or entirely rolled to the top of the frame attachment as is illustrated in Figure 6.

When the extending sections are rolled to the inoperative position, the straps 76 which are associated with the closure or cover 60 are wrapped around the rolled portion and attached to the conventional snap fastener element 78 in the usual manner. Of course, any side of the frame may be covered by means of one of these extending sections or, in certain instances, when it is found desirable, all the sections may be rendered operative simultaneously.

Snap fasteners may be positioned on various elements of the leg construction 32 and in various positions, as is illustrated at 80 and 82, respectively. Obviously, the snap fastener elements 80 and 82 are utilized for maintaining the pertinent closure section 72 in the completely closing position. If it is found desirable, snap fasteners may be positioned substantially midway of the longitudinal axis of the leg construction in order to maintain the closure at half position.

While there has been described and illustrated but a preferred form of the invention, it is apparent that certain variations may be made without departing from the spirit thereof. Accordingly, limitation is sought only in accordance with the scope of the following claim.

Having described the invention, what is claimed as new is:

An attachment for a child's vehicle comprising a frame including a pair of substantially U-shaped members each including a web and legs pivoted together at their ends, extensible legs pivoted to said U-shaped members at the junction of said web and first mentioned legs, self-locking hinge braces attached to said extensible legs and the webs of said U-shaped members, means for attaching said extensible legs to a child's vehicle, a cover secured to said frame, fastening means attached to said frame and said cover for maintaining said cover in selected positions relative to said frame, said means for attaching said extensible legs to the vehicle including a plurality of bifurcated brackets having adjustable securing means operatively connected therewith, said extensible legs including sections and having means operatively connected therewith for maintaining the sections in selected relative positions.

DIANNE HALL.

REFERENCES CITED

The following references are of record in the file of this patent:

UNITED STATES PATENTS

| Number | Name | Date |
| --- | --- | --- |
| 16,925 | Jennings | Mar. 31, 1857 |
| 26,547 | Dikeman | Dec. 20, 1859 |
| 382,493 | Smith | May 8, 1888 |
| 630,147 | Webber | Aug. 1, 1899 |
| 886,222 | Koiner et al. | Apr. 28, 1908 |
| 1,312,422 | Norton | Aug. 5, 1919 |
| 1,349,929 | Van Tuyl | Aug. 17, 1920 |
| 1,456,918 | Dudley | May 29, 1923 |
| 1,988,380 | Goldberg | Jan. 15, 1935 |
| 2,088,557 | Grant | July 27, 1937 |